May 23, 1933.  H. G. LEUPOLD  1,909,971
TEMPERATURE RESPONSIVE APPARATUS
Filed Feb. 27, 1928  2 Sheets-Sheet 1
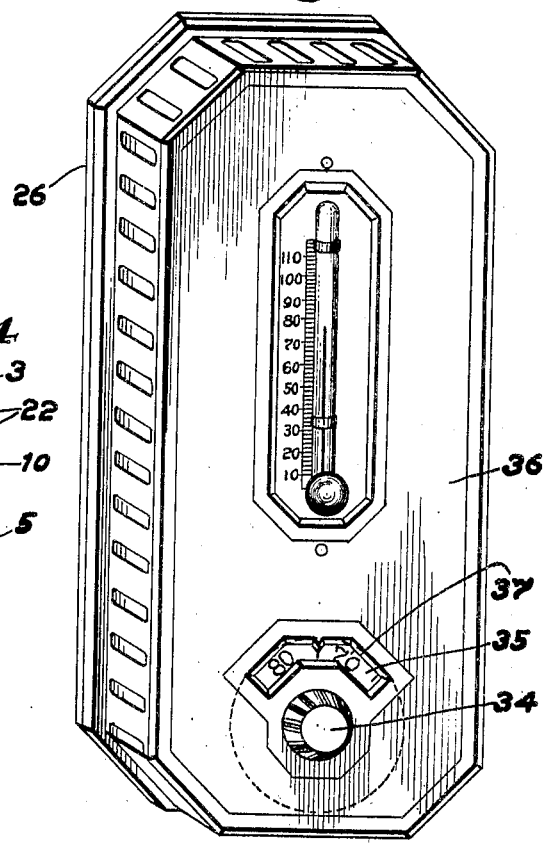
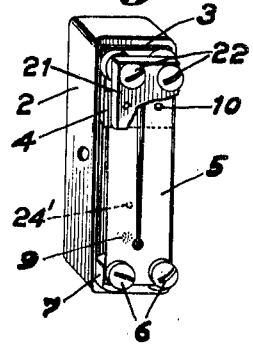
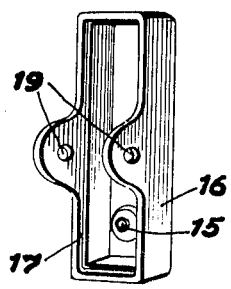
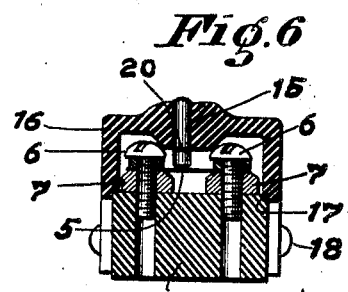
INVENTOR
Henry G. Leupold
BY
ATTORNEY

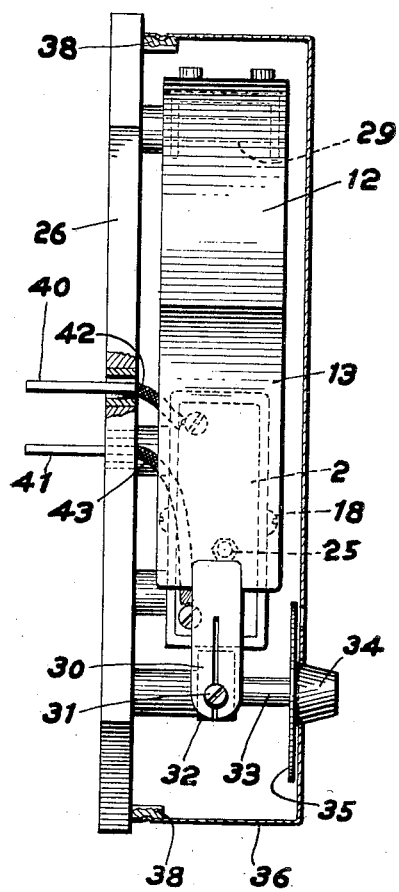
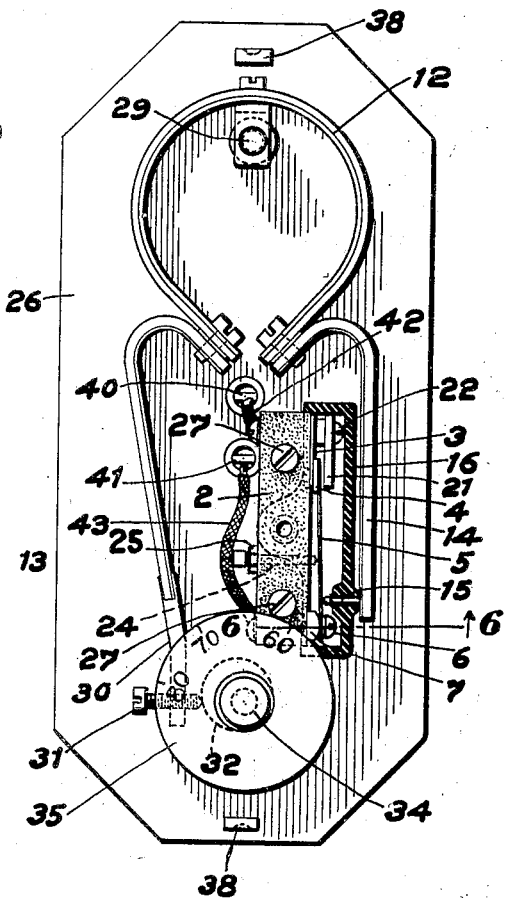

Patented May 23, 1933

1,909,971

UNITED STATES PATENT OFFICE

HENRY G. LEUPOLD, OF CAMBRIDGE, MASSACHUSETTS, ASSIGNOR TO ELECTRICAL LABORATORIES, INC., OF BOSTON, MASSACHUSETTS, A CORPORATION OF MASSACHUSETTS

TEMPERATURE RESPONSIVE APPARATUS

Application filed February 27, 1928. Serial No. 257,288.

This invention relates to temperature responsive apparatus and will be herein disclosed as embodied in a thermostatically controlled electric switch designed for use in automatically controlling the operation of domestic heating equipment. It will be understood, however, that the apparatus may be applied to many other uses and that a valve or other controlling element may be substituted for the switch contacts.

A common difficulty encountered in the use of apparatus of this character is the fact that the thermostat opens the switch very slowly and under conditions conducive to arcing at the contacts. Also, when the contacts are about to open or close they may be subjected to vibration which will bring the contacts into engagement for a very short interval and then cause them to separate slightly. If the apparatus controls the motor of an oil burner, refrigerator, or the like, this will result in the frequent and undesirable starting and stopping of the motor. Such action is wasteful of electric energy, subjects the controlled apparatus to needless wear and tends to cause the contacts of the controlling apparatus to weld together and stick, especially if used to break a current of several amperes under ordinary distributing voltages.

The present invention aims to improve apparatus of this general character with a view to increasing its reliability and its accuracy of control, and adapting the apparatus for a wider range of usefulness. Important features of the invention reside in the general organization of the apparatus, thermostat used in it, and the spring which preferably is used to operate the movable contact of the switch.

The nature of the invention will be readily understood from the following description when read in connection with the accompanying drawings, and the novel features will be particularly pointed out in the appended claims.

In the drawings,

Figure 1 is a perspective view of a thermostatic apparatus, of the type ordinarily referred to as a "house thermostat", constructed in accordance with this invention;

Fig. 2 is a vertical, cross-sectional view of the apparatus shown in Fig. 1, most of the internal mechanism being shown in side elevation;

Fig. 3 is a plan view of the apparatus shown in Fig. 1 with the cover removed;

Fig. 4 is a perspective view of the switch which preferably is used in the apparatus, the cover being removed;

Fig. 5 is a perspective view of the cover for the switch;

Fig. 6 is a transverse cross-sectional view of the switch on a larger scale; and Fig. 7 is a side view of the operating pin for the switch.

The switch unit shown in the drawings is very similar to that disclosed in my Patent No. 1,780,758, dated November 4, 1930. It comprises a base 2 of insulating material and a stationary contact 3 mounted on one end of said base. The movable contact 4, which forms the controlling element of the unit, is supported on the free end of a leaf spring 5, the opposite end of this spring being secured to the base 2 by screws 6. Preferably spacing collars 7—7, Fig. 6, are interposed between the base 2 and the spring 5.

The spring 5 is of the flat or leaf variety and it is split from its free end nearly to its opposite or fixed end. The metal of the spring is so biased or tensioned that the spring normally holds the switch closed with the movable contact 4 in engagement with the stationary contact 3, as shown in Fig. 3. A unique feature of the switch is the fact that the spring is so biased or tensioned that an area is produced as indicated, for example, by the stippled portion 9, Fig. 4, upon which pressure in one direction, in this case downward, will result in moving the free end of the spring in the opposite direction with a snap action. This tensioning or biasing of the spring preferably is produced by slotting the spring, as shown, then moving the ends of the legs so formed slightly toward each other and securing them in this relationship. In the construction shown this has been accomplished by making the contact 4 with two small pins, one of which is shown at 10, Fig. 4. Holes are formed in the ends of the legs of the spring 5, a very few thousandths of an inch farther apart than are the pins. The legs of the spring are then sprung together until their holes register with the pins or studs 10, these pins are passed through the holes and are headed over, thus securing the legs of the spring permanently in their tensioned, strained or slightly buckled positions, and at the same time securing the contact 4 on the free end of the spring 5.

Assuming that the spring 5 is one and one-half inches in length by one-half inch in width, entirely satisfactory results have been produced by making the spring of phosphor bronze or steel of, say, five or six thousandths of an inch in thickness, and springing the legs of the spring toward each other by, say, five or six thousandths of an inch. In order better to control the position of the sensitive area 9 it is preferable to slot the spring 5 by shearing and to rivet the pin 10 to the right-hand leg, Fig. 4, of the spring before springing the left-hand leg into place and riveting the pin to hold it in position. This will result in bulging the left-hand leg, Fig. 4, slightly and will, in most cases, result in producing a sensitive area in approximately the region indicated in Fig. 9. While there will necessarily be some variation in different switches, the method above described produces results having a high degree of uniformity. This arrangement therefore provides for a manufacturing control which is highly important from a practical standpoint. Furthermore, it avoids any necessity for shaping the spring by pressing the metal between dies, or the like, which produces very substantial variations in the springs and is, therefore, a very difficult method to control.

In order to operate the switch automatically a thermostat is provided, this thermostat being of the compound type and consisting of three sections 12, 13 and 14. It will be seen from an inspection of Fig. 3 that the two legs 13 and 14 of the thermostat extend in the same general direction, although not necessarily parallel to each other, and that the switch 2 is mounted between these legs. This thermostat preferably is so constructed that it contracts upon heating, and the contracting movement is utilized to apply pressure to the sensitive area 9 of the spring 5 and thus open the switch. Such pressure is applied to the switch through an operating member which consists of a pin 15 slidably mounted in and projecting through the cover 16 of the switch. The cover is seated firmly on the base 2 and is provided with an internal shoulder 17, Figs. 5 and 6, for this purpose, the cover being held in this position by a screw 18, Figs. 2 and 6, which passes through the base 2 and through the holes 19—19 in the cover. The outer end of the pin 15 projects only slightly beyond the outer face of the cover so that the maximum movement of the pin produced by the thermostat is limited by the engagement of the leg 14 of the thermostat with the cover. It is thus impossible for the thermostat to apply sufficient pressure to the spring 5 to distort the spring permanently. In other words, this arrangement limits the maximum movement of the sensitive area of the spring which can be produced by the thermostat. Outward movement of the pin 15 relatively to the cover is limited by the split spring 20, Fig. 7, which grips the grooved portion of the pin and is arranged to engage the inner surface of the cover 16.

When the spring 5 has snapped the contact 4 into its open position it strikes an insulating plate 21 which overhangs the free end of the spring and serves to limit the opening movement of the switch. This plate is held in its operative position by the two screws 22—22, Fig. 4, which fasten the stationary contact 3 to the base 2.

I have found that the snap action of the spring 5 can be increased and made more positive by mounting a fixed member between the base 2 and the spring 5 where it will engage the lower surface of the spring at a point between the sensitive area 9 and its free end. Such a device may conveniently consist of an adjusting screw 24, Fig. 3, threaded through the base 2 and locked in its adjusted position by the check nut 25. It is preferable to adjust the screw 24 so that it does not engage the spring 5 when the spring is in its normal condition, but will be engaged by the spring while the pin 15 is in the act of applying pressure to the sensitive area 9 and just before the spring should snap to open the switch. It should, of course, be located so as to engage that leg of the spring which is slightly deformed or tensioned, a suitable position for the part 24 being indicated at 24′ in Fig. 4. When so positioned the screw 24 acts as a fulcrum for the spring in producing its snap movement.

While the screw 24 is not absolutely essential, it is preferable to use it. If, for example, the pin 15 is made a few thousandths of an inch too long, it may happen that the thermostat will act through the pin to snap the switch into its open position in the manner intended and under some circumstances further contraction of the thermostat may then occur so that a further inward movement of the pin 15 is produced. Such movement may be sufficient to force the spring 5 back far enough to close the switch again. The screw 24, however, effectually prevents such an occurrence since if such an abnormal movement of the pin 15 occurs, the screw acts as a fulcrum for the spring so that the additional movement of the pin simply results in an increased tendency to hold the switch open. For this purpose it is not necessary to have the screw 25 engage the spring at any time during normal operation but only under abnormal conditions such as those just described. All of the operating parts of the apparatus are mounted on a main base 26 made of insulating material, the switch base 2 being fastened to the main base 26 by screws 27. The device ordinarily is mounted in a vertical position on a wall and the thermostat is suspended on a pivot screw or bolt 29 so that it can swing freely about the axis of this bolt. The thermostat shown is of unique construction designed to produce a relatively large change in distance between the ends of the legs 13 and 14 per degree of change in temperature. For this purpose the central section or member 12 of the thermostat is made of approximately horse-shoe shape, the ends of this member, however, being brought close together, while the two sections 13 and 14 are each of a shape similar to the letter J. The short legs of the two latter sections are secured rigidly to the opposite ends of the member 12. I have found that this construction works very satisfactorily. The sections 12, 13 and 14 may be made of commercial bimetallic strip stock, such as brass and invar, the layer of invar in the present case being inside while the layer of brass is outside, so that upon a rise in temperature the ends of the legs 13 and 14 move toward each other, and upon a drop in temperature they spread apart.

In order to adjust or predetermine the temperature at which the switch will be opened, the section 13 of the thermostat is provided with an extension 30 which is split to receive and grip an adjusting screw 31 that bears against the surface of a cam 32 mounted to rotate with a shaft 33. A thumb piece 34 and a dial 35 also are secured on this shaft, the dial being located immediately behind the front wall of a casing 36 which encloses all of the operating parts. The numbers on the dial may be seen through a window 37, Fig. 1, provided in the casing. Due to the relatively narrow range of temperature required of an apparatus of this character, the cam 32 may conveniently be made in the form of an eccentric. Sufficient friction is maintained on the shaft 33 to hold it in any positon to which it is moved. It will be seen from an inspection of Fig. 3 that by turning the knob 34 toward the left the cam 32 will act through the leg 13 to swing the opposite leg 14 of the thermostat toward the left and thus will cause the thermostat to operate the switch spring 5 at a lower temperature. An adjustment of the cam in the opposite direction will have the reverse effect.

In order to support the casing 36 removably, short lugs 38—38 are fixed in the base 26 and are provided with depressions to register with small projections punched inwardly from the end walls of the casing.

An apparatus of this kind is customarily required to control current in a one hundred ten volt circuit, and it is desirable, therefore, to provide for plugging the device directly into a socket of the ordinary commercial form. For this purpose terminals 40 and 41 are secured rigidly in the base 26 and project from the back of the base, these terminals being of the proper shape and dimensions to fit in an ordinary wiring socket. Conductors 42 and 43 connect the respective terminals 40 and 41 with the contact 3 and spring 5, respectively.

The operation of the apparatus will be understood from the foregoing description. Assuming that the parts are in the relative position shown in Fig. 3, a further rise in temperature of the thermostat will cause the legs 13 and 14 to tend to move toward each other, and since the leg 13 is held against such movement, the leg 14 alone can move inwardly. This will result in pushing the pin 15 against the sensitive area of the spring 5, a movement of only a very few thousandths of an inch of the pin being required to cause the spring to snap the switch into its open position. The contacts will remain open until the temperature has dropped sufficiently to relieve the pressure on the sensitive area of the spring, when the spring again will snap the switch into its closed condition due to the inherent resiliency of the spring and the peculiar way in which it is biased or tensioned. The particular temperature at which the switch will be opened or closed depends on the adjustment of the dial 35.

It will now be appreciated that this invention provides a relatively simple and very compact apparatus for automatically controlling an electric circuit in response to changes in temperature. It has been demonstrated in practice that an apparatus of this construction will maintain an exceptionally close control, operating within a range of one degree above or below a given value. The apparatus is extremely reliable and will give an unusually long period of service without requiring repairs or attention other than the adjustment for the temperature to be maintained. The fact that the switch opens and closes with an abrupt or snap movement is particularly valuable in an apparatus of this character.

In the particular construction shown the spring 5 normally holds the switch contacts in their closed relationship. It will be obvious, however, that by making the part 3 of insulating material and the part 21 of conducting material, the action of the switch will be reversed, it normally remaining open but snapping into its closed position upon a rise in temperature. Such an arrangement would be desirable, for example, in controlling the temperature of a refrigerator. The same effect can be produced by reversing the relationship of the brass and invar strips in the thermostat.

While I have herein shown and described a preferred embodiment of my invention, it will be understood that the invention may be embodied in other forms without departing from the spirit or scope thereof. For example, instead of having the spring 5 move a switch contact it can be made to operate a valve or some other controlling element.

Having thus described my invention, what I desire to claim as new is:

1. In an apparatus of the character described, the combination of a controlling element, a leaf spring for moving said element, said spring having a sensitive area upon which pressure will result in producing a snap movement of another portion of the spring in a direction opposite to the direction of application of the pressure, the spring being operative to return automatically to its initial position when said pressure is removed, a movable member arranged to bear on said spring to apply pressure to said area, a curved thermostat having legs extending in the same general direction and spaced apart, said thermostat being arranged to move said member to apply said pressure to the spring, said spring being mounted between said legs, and means for adjusting the temperature at which said spring will be operated by said thermostat.

2. In an apparatus of the character described the combination of a controlling element, a leaf spring for moving said element, said spring having a sensitive area upon which pressure will result in producing a snap movement of another portion of the spring in a direction opposite to the direction of application of the pressure, the spring being operative to return automatically to its initial position when said pressure is removed, a movable member arranged to bear on said spring to apply pressure to said area, a curved thermostat having legs extending in the same general direction and spaced apart, one leg of said thermostat being arranged to move said member to cause it to apply pressure to said spring, and a cam movable to act on the other leg of said thermostat to predetermine the temperature at which said thermostat will operate said spring.

3. In an apparatus of the character described, the combination of a controlling element, a leaf spring for moving said element, said spring having a sensitive area upon which pressure will result in producing a snap movement of another portion of the spring in a direction opposite to the direction of application of the pressure, the spring being operative to return automatically to its initial position when said pressure is removed, a movable member arranged to bear on said spring to apply pressure to said area, a curved thermostat having legs extending in the same general direction and spaced apart, one leg of said thermostat being arranged to move said member to cause it to apply pressure to said spring, a cam movable about an axis and arranged to act on the other leg of said thermostat to predetermine the point at which the thermostat will operate said spring, and a dial movable with said cam, said cam and spring being mounted between the legs of said thermostat.

4. In an apparatus of the character described, a compound thermostat comprising a thermostatic member of approximately horse-shoe shape, and two curved thermostatic strips each secured to opposite ends of said member and having legs extending away from said member in the same general direction.

5. In an apparatus of the character described, a compound thermostat comprising a thermostatic member of approximately horse-shoe shape but having its ends located closely adjacent to each other, and two curved thermostatic strips each secured to opposite ends of said member and having legs extending away from said member in the same general direction.

6. In an apparatus of the character described, a compound thermostat comprising a thermostatic member of approximately horse-shoe shape, and two curved thermostatic strips each of approximately J-shape, the short legs of each of said strips being secured, respectively, to opposite ends of said member and their longer legs extending away from said member in the same general direction.

7. In an apparatus of the character described, the combination of a controlling element, a leaf spring for moving said element, said spring being slotted longitudinally, a support for one end of said spring, the opposite end of said spring being free, said spring having a sensitive area adjacent to one end of the slot therein upon which area pressure will result in producing a snap movement of the free end of the spring in a direction opposite to the direction of application of pressure, said spring being so biased as to return automatically to its initial position when said pressure is removed, the support for said spring including a base, a cover cooperating with said base to form a casing enclosing said spring and said element, a pin guided in an aperture formed through said cover and positioned to bear against said sensitive area, said casing and the parts contained therein forming a self-contained and portable unit, and means cooperating with said pin to prevent its removal from said casing.

8. In an apparatus of the character described, the combination of a controlling element, a leaf spring for moving said element, said spring being slotted longitudinally, a support for one end of said spring, the opposite end of said spring being free, said spring having a sensitive area adjacent to one end of the slot therein upon which area pressure will result in producing a snap movement of the free end of the spring in a direction opposite to the direction of application of pressure, said spring being so biased as to return automatically to its initial position when said pressure is removed, the support for said spring including a base, a cover cooperating with said base to form a casing enclosing said spring and said element, a pin guided in an aperture formed through said cover and positioned to bear against said sensitive area, said casing and the parts contained therein forming a self-contained and portable unit, and a screw adjustably threaded in said base with its end positioned close to said spring at the side of the spring opposite to the surface thereof engaged by said pin and arranged for engagement with said spring at a point closely adjacent to said area but in a region located between said area and said element.

HENRY G. LEUPOLD.